Patented Feb. 19, 1924.

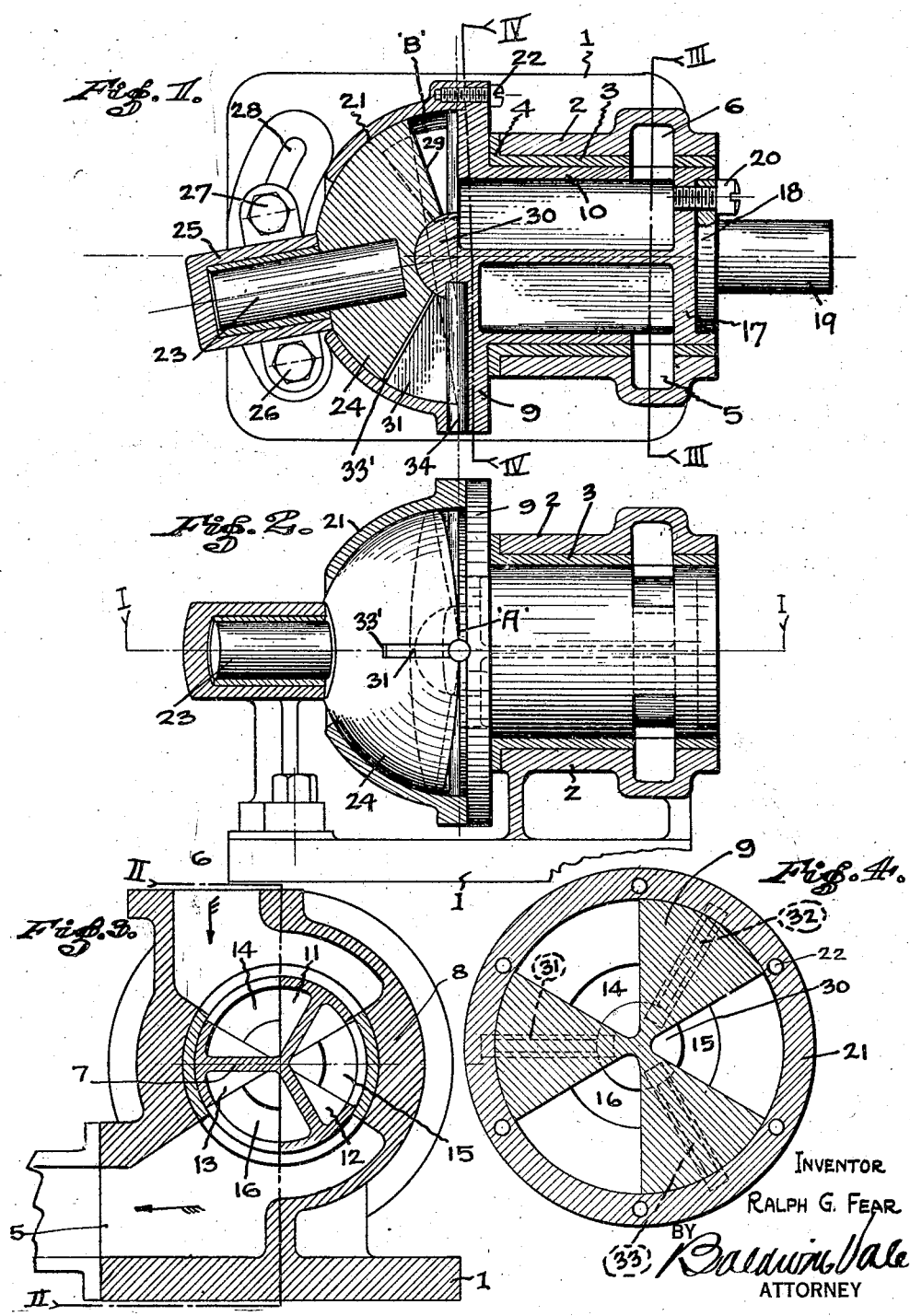

1,484,212

UNITED STATES PATENT OFFICE.

RALPH G. FEAR, OF OAKLAND, CALIFORNIA, ASSIGNOR TO JACOBSON & FEAR, A CO-PARTNERSHIP CONSISTING OF H. O. JACOBSON AND R. G. FEAR.

ENGINE.

Application filed March 30, 1920. Serial No. 369,900.

*To all whom it may concern:*

Be it known that I, RALPH G. FEAR, a citizen of the United States, and a resident of the city of Oakland, county of Alameda, State of California, have made a new and useful invention—to wit; Improvements in Engines; and I do hereby declare the following to be a full, clear, concise, and exact description of the same.

This invention relates more particularly to rotary engines.

Among the objects of the invention are to minimize internal friction within the engine and to eliminate peripheral friction; to simplify the construction and operation of the engine by reducing the number of working parts; and to vary the capacity of the engine by varying the differential displacement. Other objects and advantages will appear as this description progresses.

In this specification and the annexed drawings, the invention is illustrated in the form considered to be the best, but it is to be understood that the invention is not limited to such form, because it may be embodied in other forms; and it is also to be understood that in and by the claims following the description it is desired to cover the invention in whatsoever form it may be embodied.

The term spherical is used herein to define any form partaking of the nature of a sphere or any segment or part of a sphere.

In the accompanying one sheet of drawings,

Fig. 1. is a plan view from above in horizontal section of an engine constructed in accordance with this invention taken on the line I—I of Fig. 2.

Fig. 2. is a side view of the same in cross section taken on the line 2—2, Fig. 3.

Fig. 3. is an end view in cross section taken on the line 3—3, Fig. 1.

Fig. 4. is a cross sectional view taken on line IV—IV, Fig. 1.

In detail the construction illustrated in the drawings, includes the bed 1 having a cylindrical bearing 2 formed thereon. This bearing is lined with the bushing 3 composed of any suitable anti-friction metal flanged outward at 4 to form a thrust bearing. Adjacent to the outer end, the bearing is provided with the intake port 5 and the outlet port 6, separated by the segmental divisions 7 and 8 located on the horizontal diameter.

The casing comprises the circular base disc 9 having the journal 10 formed thereon and rotating within the bushing 3. This journal serves as a manifold, having three longitudinal passages 11, 12, and 13 formed therein, and open through the disc 9 at one end, and having outward by-passes 14, 15 and 16 communicating with the inlet and outlets 5 and 6 respectively, in accordance with the operating cycles of the engine. The end of the journal 10 is closed as at 17 and recessed to receive the flange 18 of the shaft 19 that is bolted thereto by the bolts 20 for the application or delivery of power.

The substantially hemispherical casing 21 is bolted fast to the disc 9 by the bolts 22 to form a hermetic joint. This hemispherical casing is open at the opposite end concentric with the axis, to clear the stub shaft 23 of the rotary piston 24 fixed thereon. This shaft 23 is journaled in the bearing 25 adjustably fixed to the base 1 by the bolts 26 and 27, passing through the arcuate slot 28 in the base, which manner of mounting the bearing permits adjustment of the shaft 23 at any angle to the axis of the shaft or journal 10. The body of the piston 24 is formed in the segment of a sphere snugly fitting the interior of the casing 21, to permit an oscillating movement of the piston therein. The face of the piston is in the form of a flat truncated cone, the angle of its face 29 is on a parallel plane with the disc 9 when the shaft 23 is set at the extreme angle shown in Figs. 1 and 2. The hemispherical pivot 30 is set axially from the plane of the disc 9 and fits into a similar socket in the axis of the revolving piston 24, the curve of the socket being concentric with the curve of the hemispherical casing 21, to permit a free movement of the piston 24 with respect to the pivot 30.

At intervals the radial vanes 31, 32, and 33, extending outward from the plane of the disc 9, enter snugly the slots 33′ formed radially in the piston 24. To provide for the differential pivoting of the vanes in their lateral movement into and out of the slot 33′, they are mounted on the trunnions 34, engaging close fitting recesses formed radially in the face of the disc 9. The outer end of the trunnions 34 are pivotal between the outer casing 21 and the disc 9, in suitably formed sockets, the inner ends engage sockets formed beneath the pivot 30. For symmetrical development of power I prefer three vanes as shown, although a greater or lesser number would operate successfully with suitable modification of the co-related parts.

This invention operates substantially as follows: When used as a pump or compressor power is applied to the shaft 19, to rotate it in clockwise direction. Moving the vane 31 from the point of contact A between the piston 24 and the disc 9, toward the opposite diameter at which point the faces 9 and 29 meet their maximum separation, for the suction cycle B. The gradual enlargement of the space between the vanes 31 and the preceding vane 32 creates a suction on the intake port 6 through the manifold conduit 11 between the vanes 31 and 32, which fills with air, water, or whatever the pump may be connected with. This suction continues until the vane 31 passes the segment 8 and cooperates with the segment 7 and the journal 10 to form a valve between the intake 6 and the outlet 5. Passing the segment 8 the chamber B begins to discharge into the outlet 5, initiating the discharge cycle, the vanes again pass between the segment 7 to initiate the cycle A, that is neutral between the intake and the discharge. Each vane goes through the several cycles successively, in their turn sucking and filling and discharging or emptying, the various cycles occuring in such short moments of time, that the action is continuous.

In the operation of this invention peripheral friction between the casing 21 and the piston 24 is minimized, since they are both rotating in unison in the same direction and the relative movement between them is the progressive reciprocation incidental to the angular set of their respective axes. The only other resistance that the piston 24 offers to the rotation in this manner is the friction of the shaft 23 in its bearings and any friction that may exist between these vanes and their respective sockets 33′ incident to the weight of liquid being carried around. The line of contact between the plane 9 of the disc and the face of the piston 24 at A forms the division between the intake and the discharge cycles irrespective of the number of vanes. The capacity or the differential displacement of the piston within the casing 21 may be varied at will by simply altering the angle of the axis of the shaft 23 with respect to the line of the axis of the shaft 19, which would accomplish a complete reversal in the operation of the intake and discharge. This gives control from the minimum to the maximum capacity of the pump it follows therefore that if the shaft 23 were in alignment with the shaft 19 the capacity of the pump would be zero, any liquid contained within the casing 21 would merely be carried around by the vanes without further intake or discharge subject to the action of centrifugal force. The pump therefore becomes in effect a valve controlling its own capacity by the proper manipulation of the angularity of the shaft 22. I have shown a very simple means for adjusting this shaft in any fixed position. It is obvious however that where desirable any other means may be applied between the bearing 25 and the base 1 for facilitating the adjustment of the shaft 23 for special purposes.

When used as a motor or prime mover a suitable fluid under pressure, or an expansive fluid such as steam, compressed air or the like introduced through the inlet 6 passes through the port 11 enters between the vanes 31, and 32, and being unable to pass the contact point between the disc 9 and the piston 29 at A, forces the vane 32 towards the opposite side completing the cycle B, which is the greatest expansion or capacity, the fluid pressure or expansion pressure continues to operate until the exhaust cycle is reached through the exhaust outlet 5. The operation continuing through the intake and exhaust cycle by rotation of the shaft 19 in a clockwise direction in accordance with the arrangement shown in Fig. 1. When it is desired to reverse the motor the shaft 23 is shifted to the opposite axial center of the shaft 19, which causes the reverse action of the fluid pressure against the vanes and causes the shaft 19 to rotate in a contra clockwise direction. All of the variations from zero to full capacity in either direction of rotation are available by moving the axis of the shaft 23 from alinement with the axis of the shaft 18 angularly in either direction as previously described.

This form of engine lends itself particularly to use in connection with hydraulic transmissions involving two or more interconnecting units, whereby one serves as a driving unit for forcing oil or other suitable medium into and through a driven unit or units of the same construction, by means of which any speed ratio in either direction is available, from neutral to full capacity by varying either the prime mover or the driven unit by shifting the axis of the shaft 23. This phase of the invention is made the subject of a separate and companion application.

Having thus described this invention, what I claim and desire to secure by Letters Patent is:—

1. An engine comprising a base having a bearing, a casing having a combined inlet and outlet journal shaft journaled in the bearing, said casing having a substantially flat wall and an opposed hemi-spherical wall formed at its center with an opening, said base having an arcuate slot, a bearing adjustably secured in the slot, and a piston within the casing having a stub shaft extending through the opening in the casing and journaled in the second bearing.

2. An engine comprising a base having a bearing, a casing journaled in the bearing and having a hemi-spherical wall formed at its center with an opening, a bearing adjustably secured to the base for adjustment on an arc having a center common to the hemi-spherical wall, and a piston within the casing having a stub shaft extending through the opening of the hemi-spherical wall and journaled in the second bearing.

In testimony whereof, I have hereunto set my hand at San Francisco, California, this 23rd day of March 1920.

RALPH G. FEAR.

In presence of—
LINCOLN V. JOHNSON.